United States Patent
Harnack et al.

(10) Patent No.: US 11,643,288 B2
(45) Date of Patent: May 9, 2023

(54) INTEGRATED SHIPPING RAMP FOR MULTI-PACKAGE UNIT LOADS

(71) Applicant: International Business Machines Corporation, Armonk, NY (US)

(72) Inventors: Tate T. Harnack, Rochester, MN (US); Kael B. Eddy, Lanesboro, MN (US); Michael J. Macpherson, Elgin, MN (US); Steven C. Erickson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1267 days.

(21) Appl. No.: 16/136,643

(22) Filed: Sep. 20, 2018

(65) Prior Publication Data

US 2020/0095076 A1   Mar. 26, 2020

(51) Int. Cl.
*B65G 69/30* (2006.01)
*B65D 19/38* (2006.01)

(52) U.S. Cl.
CPC ............. *B65G 69/30* (2013.01); *B65D 19/38* (2013.01); *B65D 2519/00805* (2013.01)

(58) Field of Classification Search
CPC ............... B65D 19/38; B65D 21/0209; B65D 2519/00805; B65D 2019/00805; B65G 69/30
USPC ......... 206/521, 595, 596, 598, 600; 14/69.5, 14/71.1
See application file for complete search history.

(56) References Cited

U.S. PATENT DOCUMENTS

| | | | | |
|---|---|---|---|---|
| 3,153,798 A | * | 10/1964 | Drevitson | B65G 69/30 14/69.5 |
| 3,583,061 A | * | 6/1971 | Adams | B61J 3/12 29/469 |
| 5,133,459 A | * | 7/1992 | Genix | B65D 81/107 206/335 |
| 5,597,114 A | * | 1/1997 | Kramedjian | A47F 5/112 220/495.11 |
| 5,911,179 A | | 6/1999 | Spiczka | |
| 6,105,511 A | * | 8/2000 | Bridges | B65D 19/0026 312/265.5 |
| 6,349,656 B1 | * | 2/2002 | Mitchell | B65D 19/0087 108/901 |
| 6,769,368 B2 | | 8/2004 | Underbrink et al. | |
| 7,293,508 B2 | * | 11/2007 | Johnson | B65D 19/00 108/51.11 |

(Continued)

*Primary Examiner* — Steven A. Reynolds
(74) *Attorney, Agent, or Firm* — Nathan M. Rau (57) ABSTRACT

An integrated shipping ramp for multi-package unit loads including a ramp portion configured to guide an upper package down from atop a lower package; and a lower package attachment portion comprising a corner board for insertion into a cavity of the lower package, wherein inserting the corner board into the cavity of the lower package secures the lower package attachment portion to the lower package, wherein in a shipping configuration the ramp portion is integrated with a multi-package unit load comprising the upper package and the lower package, and wherein in a dismounting configuration the ramp portion provides an inclined platform from a top of the lower package to a height below the top of the lower package.

14 Claims, 5 Drawing Sheets

(56) References Cited

U.S. PATENT DOCUMENTS

| | | | | |
|---|---|---|---|---|
| 7,401,798 B2* | 7/2008 | Dolan | ............... | B60R 3/02 |
| | | | | 182/97 |
| 7,448,104 B2 | 11/2008 | Turner | | |
| 8,052,114 B2* | 11/2011 | Saggers | ............... | B65D 19/38 |
| | | | | 248/346.02 |
| 8,646,140 B2* | 2/2014 | Branyon | ............... | B65G 69/30 |
| | | | | 14/69.5 |
| 9,776,758 B2* | 10/2017 | Rentzel | ............... | B65D 85/04 |
| 2004/0108238 A1 | 6/2004 | Maresh | | |
| 2013/0133143 A1* | 5/2013 | Purdon | ............... | B65G 69/30 |
| | | | | 14/69.5 |

\* cited by examiner

INTEGRATED SHIPPING RAMP FOR MULTI-PACKAGE UNIT LOADS

BACKGROUND

Field of the Invention

The field of the invention is multi-package unit loads, or, more specifically, an integrated shipping ramp for multi-package unit loads.

Description Of Related Art

Heavy products shipped together are generally stacked on top of one another. Once such a unit load of packages arrives at a customer's dock, three or four people may be required to lift the packages off each other. Lifting the heavy packages is difficult work, and without the necessary number of workers, such work may be unsafe. Removing the packages by hand risks mishandling the packages and package damage. Further, workers handling the packages risk bodily injury. Machines, such as forklifts, may also damage the packages if not used properly or if the unit load is not properly configured for the machine.

SUMMARY

An integrated shipping ramp for multi-package unit loads is disclosed in this specification. The integrated shipping ramp for multi-package unit loads includes a ramp portion configured to guide an upper package down from atop a lower package; and a lower package attachment portion comprising a corner board for insertion into a cavity of the lower package, wherein inserting the corner board into the cavity of the lower package secures the lower package attachment portion to the lower package, wherein in a shipping configuration the ramp portion is integrated with a multi-package unit load comprising the upper package and the lower package, and wherein in a dismounting configuration the ramp portion provides an inclined platform from a top of the lower package to a height below the top of the lower package.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
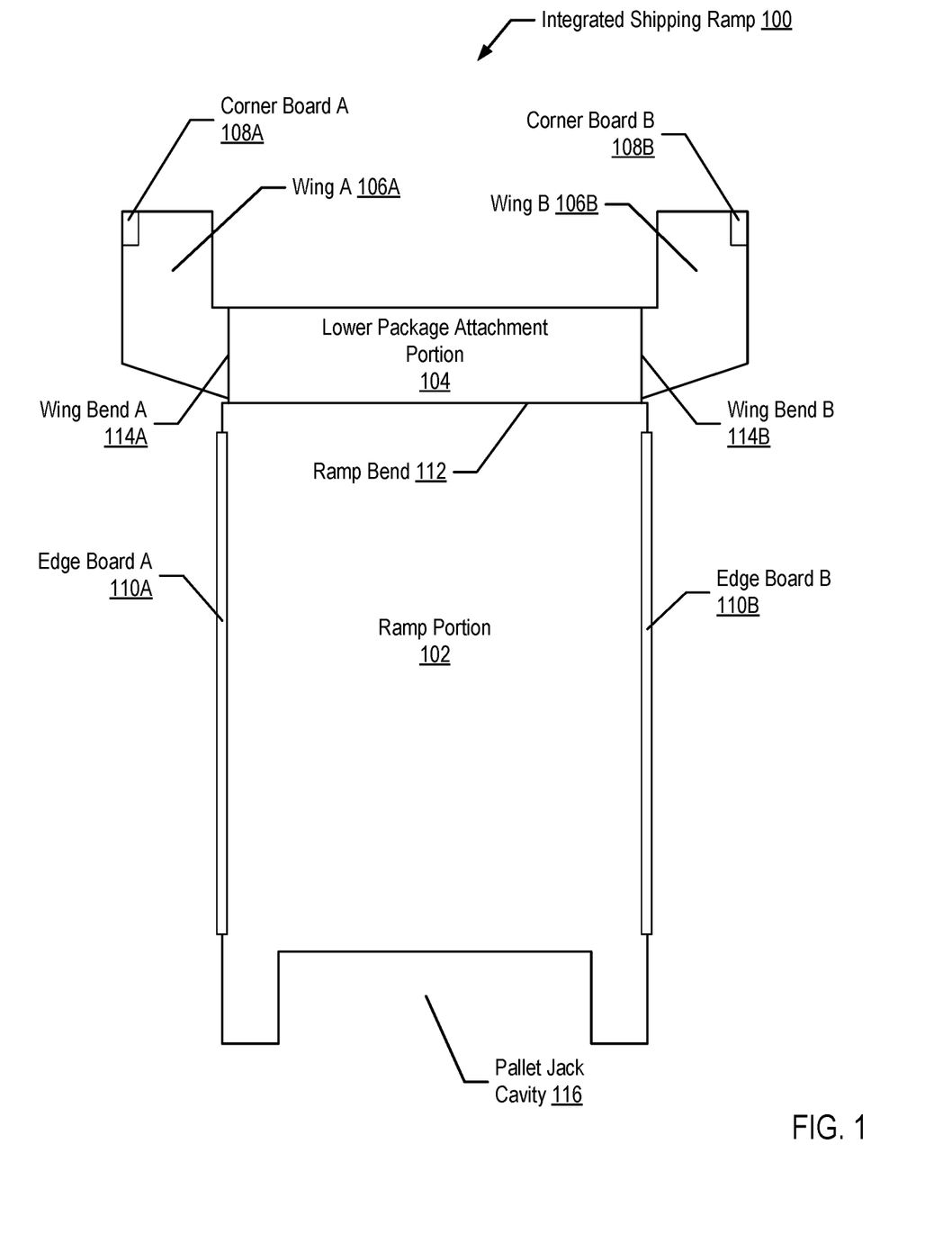
FIG. 1 sets forth a front flat view diagram of an integrated shipping ramp for multi-package unit loads according to embodiments of the present invention.
Figure 2:
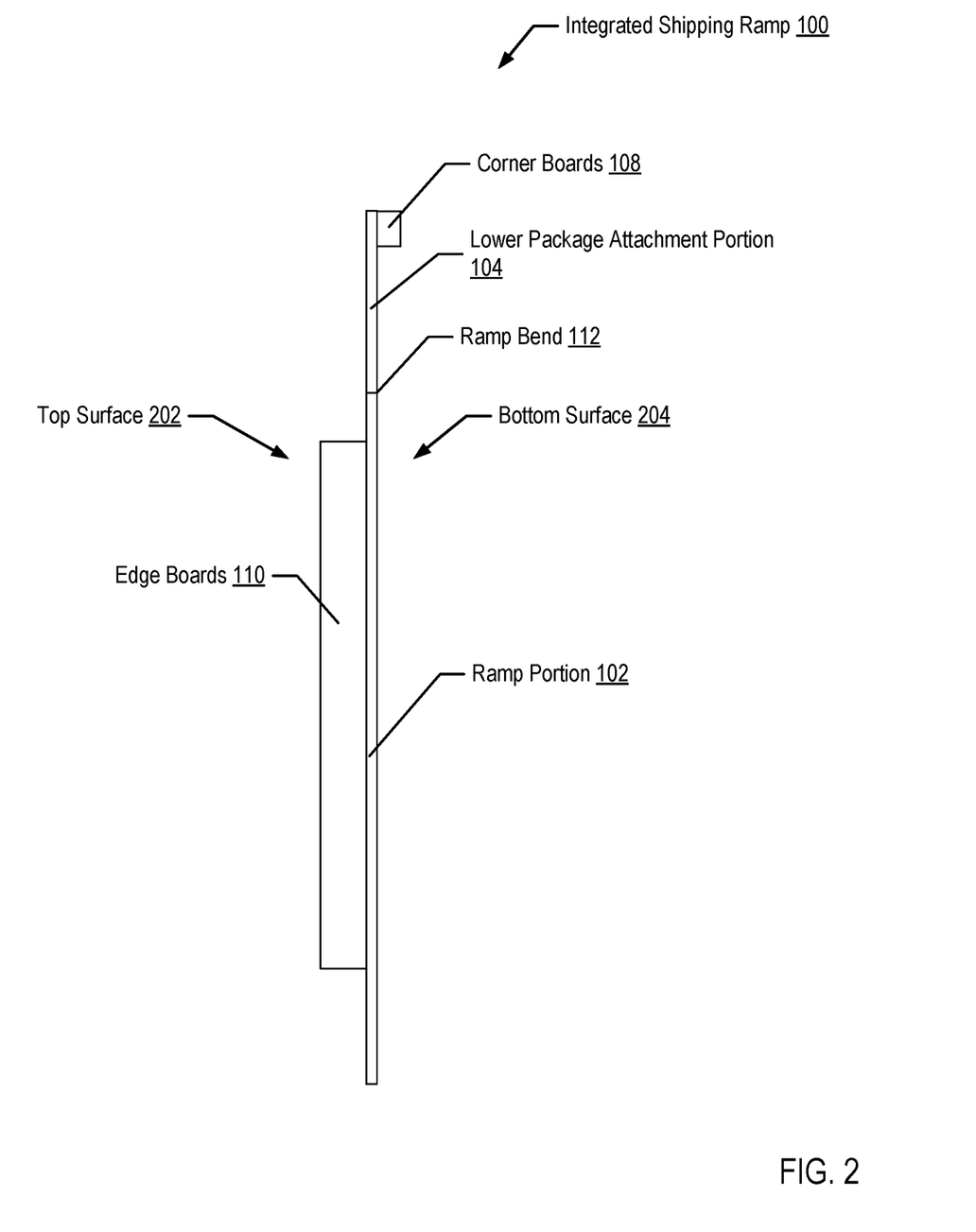
FIG. 2 sets forth a side flat view diagram of an integrated shipping ramp for multi-package unit loads according to embodiments of the present invention.

Exemplary products for an integrated shipping ramp for multi-package unit loads in accordance with the present invention are described with reference to the accompanying drawings, beginning with FIGS. 1 and 2. FIG. 1 shows a front flat view of an exemplary integrated shipping ramp (100) in accordance with the present invention. FIG. 2 shows a side flat view of an exemplary integrated shipping ramp (100) in accordance with the present invention. As shown in FIG. 1, the integrated shipping ramp (100) includes a ramp portion (102) and a lower package attachment portion (104) hinged together by a ramp bend (112). The ramp portion (102) includes two edge boards (edge board A (110A), edge board B (110B)) on either side of the ramp portion (102) and a pallet jack cavity (116) opposite the ramp bend (112). The lower package attachment portion (104) includes wing A (106A) hinged to the lower package attachment portion (104) by the wing bend A (114A). The lower package attachment portion (104) also includes wing B (106B) hinged to the lower package attachment portion (104) by the wing bend B (114B). Each wing (wing A (106A), wing B (106B)) includes corner board (corner board A (108A), corner board B (108B)).

The integrated shipping ramp (100) is a ramp integrated into a multi-package unit load that includes an upper package and a lower package. The integrated shipping ramp (100) is designed for at least two configurations. In a shipping configuration, the integrated shipping ramp (100) is configured for integration with the multi-package unit load during shipping. Specifically, in the shipping configuration, the integrated shipping ramp (100) is configured for placement alongside at least one surface of the multi-package unit load. In a dismounting configuration, the integrated shipping ramp (100) is configured to attach to a lower package of the multi-package unit load and guide an upper package down from atop the lower package.

The ramp portion (102) is a portion of the integrated shipping ramp (100) configured to guide an upper package down from atop a lower package. In the dismounting configuration, the ramp portion (102) provides an inclined platform hinged at the ramp bend (112). The inclined platform extends from a top of the lower package to a height below the top of the lower package. The upper package may be guided by the ramp portion (102) from atop the lower package to a lower surface such as a floor or a pallet jack.

The ramp bend (112) is a hinge between the ramp portion (102) and the lower package attachment portion (104). In the dismounting configuration, the ramp bend (112) allows the ramp portion (102) to be maneuvered down toward the bottom surface (204) of the integrated shipping ramp (100) relative to the lower package attachment portion (104). In the shipping configuration, the ramp bend (112) may allow the ramp portion (102) and the lower package attachment portion (104) to be compacted or conformed to one or more surfaces of the multi-package unit load. For example, the ramp bend (112) allows the ramp portion (102) to be maneuvered up toward the top surface (202) of the integrated shipping ramp (100) relative to the lower package attachment portion (104) such that the ramp portion (102) and the lower package attachment portion (104) are folded on top of one another.

The edge boards (edge board A (110A), edge board B (110B)) run along each side of the ramp portion (102) and, in shipping configuration, guide the upper package down from atop the lower package. The edge boards (110) extend from the top surface (202) of the integrated shipping ramp (100). The edge boards (edge board A (110A), edge board B (110B)) prevent an upper package from falling from a side of the ramp portion (102).

The pallet jack cavity (116) is a cavity in the ramp portion (102) configured to receive a pallet jack or other tool used to move packages. In the dismounting configuration, the pallet jack cavity (116) creates a hole in the ramp portion (102) with a lower surface, such as a floor. The pallet jack cavity (116) may be larger than the fork or forks of a standard pallet jack. Further, the ramp portion (102) may include two pallet jack cavities (116) configured to each individually receive one fork of a pallet jack. Finally, the ramp portion (102) may be configured without a pallet jack cavity (116) allowing the base of the ramp portion (102) fuller contact with the lower surface (e.g., the floor).

The lower package attachment portion (104) is a portion of the integrated shipping ramp (100) configured to secure the integrated shipping ramp (100) to a lower package. In the dismounting configuration, some or all of the lower package attachment portion (104) may rest on a top surface of the lower package. The lower package attachment portion (104) includes one or more corner boards (corner board A (108A), corner board B (108B)) that extend from the bottom surface (204) of the integrated shipping ramp (100). The corner boards (corner board A (108A), corner board B (108B)) are configured for insertion into a cavity of the lower package.

Inserting a corner board (corner board A (108A), corner board B (108B)) into the cavity of the lower package secures the lower package attachment portion (104) to the lower package. The corner boards (corner board A (108A), corner board B (108B)) may be smaller than the lower package cavity into which the corner boards are inserted. The friction between contact points of the corner boards (corner board A (108A), corner board B (108B)) and the lower package cavity may create the secure attachment between the lower package attachment portion (104) and the lower package.

The corner boards (corner board A (108A), corner board B (108B)) may be designed such that inserting the corner boards into the lower package cavity locks the corner boards into place. For example, the corner boards may be compressible and/or expandable, either via a spring mechanism or via properties of the material used for the corner boards. Once inserted into the lower package cavity, the corner boards (corner board A (108A), corner board B (108B)) may expand to a size larger than at least one dimension of the lower package cavity and lock into place.

The corner boards (corner board A (108A), corner board B (108B)) may be clips inserted into cavities in the lower package attachment portion (104). Specifically, the corner boards (corner board A (108A), corner board B (108B)) may be clips initially separate from the lower package attachment portion (104) and inserted into cavities in the lower package attachment portion (104) in the dismounting configuration. The clips may create a secure attachment to both the lower package attachment portion (104) and the lower package.

The corner boards (corner board A (108A), corner board B (108B)) may be attached to wings (wing A (106A), wing B (106B)) on the lower package attachment portion (104). The wings (wing A (106A), wing B (106B)) may be on a side adjacent to the ramp bend (112) and attached to the lower package attachment portion (104) via the wing bends (wing bend A (114A), wing bend B (114B)).

In the dismounting configuration, the wings (wing A (106A), wing B (106B)) may be bent along the wing bends (wing bend A (114A), wing bend B (114B)) toward the bottom surface (204) of the integrated shipping ramp (100). The wings (wing A (106A), wing B (106B)) may then be placed on a side surface of the lower package to allow contact between the corner boards (corner board A (108A), corner board B (108B)) and lower package cavities on a side surface of the lower package.

The integrated shipping ramp (100) may comprise rigid or semi-ridged materials. The integrated shipping ramp (100) may include materials such as wood, metal, foam, or paper. Some elements of the integrated shipping ramp (100) may comprise stiffer materials than other elements. The corner boards (corner board A (108A), corner board B (108B)) may be any size, shape, or material that creates a secure attachment between the lower package attachment portion (104) and the lower package. Similarly, the edge boards (edge board A (110A), edge board B (110B)) may be any size, shape, or material that guides the upper package down the ramp portion (102) to the lower surface. For example, the corner boards (corner board A (108A), corner board B (108B)) and edge boards (edge board A (110A), edge board B (110B)) may be comprised of, or consist of, rigid compressed paper and the remainder of the ramp portion (102) and lower package attachment portion (104) may be comprised of, or consist of, semi-rigid corrugated fiberboard.

The bends (ramp bend (112), wing bend A (114A), wing bend B (114B)) may be physical hinges that attach two distinct materials to each other. Alternatively, the bends (ramp bend (112), wing bend A (114A), wing bend B (114B)) may be folds or compressions in a single continuous material.

The integrated shipping ramp (100) may be wider than the width of the lower package to which it is attached. Further, the distance between the edge boards (edge board A (110A), edge board B (110B)) may be just wider than the width of the lower package such that the upper package may freely pass between the edge boards without significant rotation (e.g., less than ten degrees rotation). The lower package attachment portion (104) and the wing or wings (wing A (106A), wing B (106B)) may be wider than the ramp portion (102) and wider than the lower package.

Figure 3:
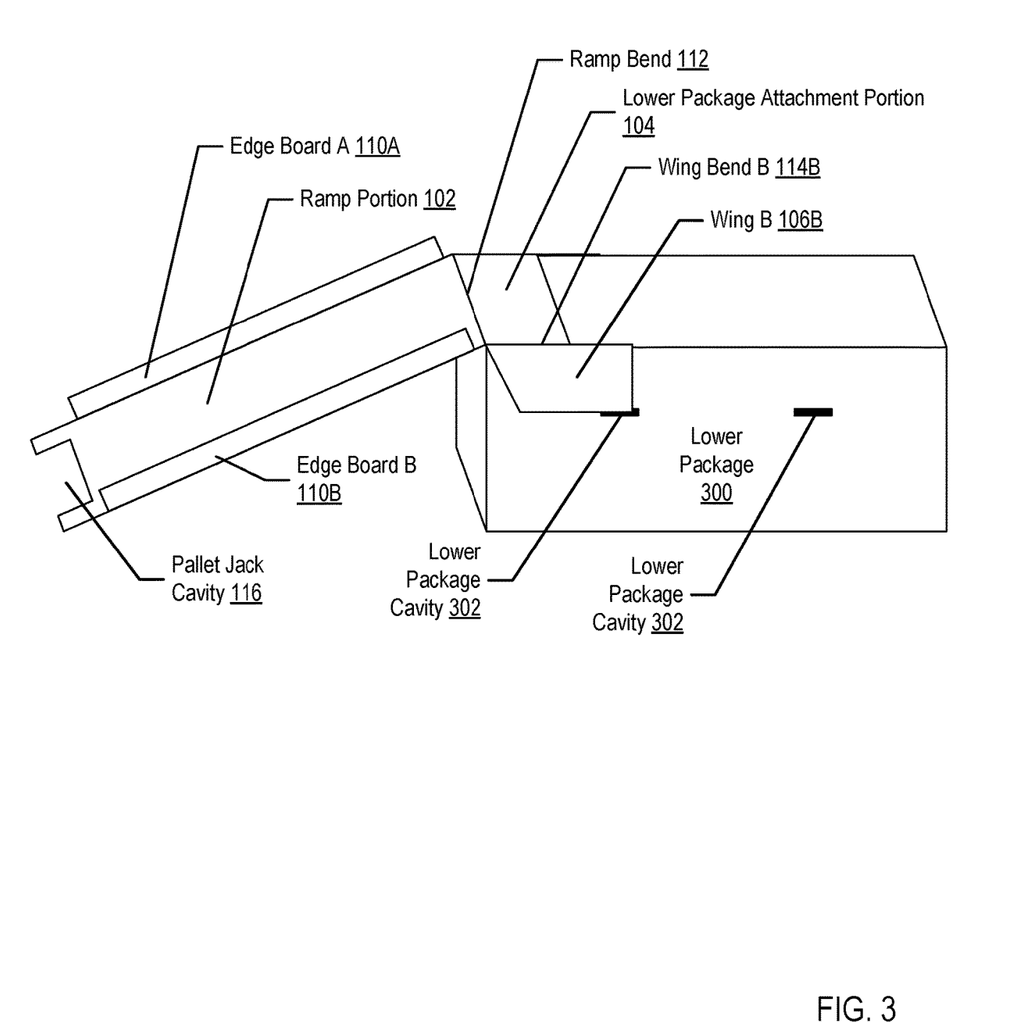
FIG. 3 sets forth an isometric diagram of an integrated shipping ramp for multi-package unit loads according to embodiments of the present invention.

FIG. 3 shows an exemplary integrated shipping ramp in the dismounting configuration in accordance with the present invention. As shown in FIG. 3, the lower package attachment portion (104) of the integrated shipping ramp has been placed atop the lower package (300). The lower package (300) includes two lower package cavities (302), and the corner board attached to wing B (106B) has been inserted in one of the lower package cavities (302).

The lower package (300) is the package to which the lower package attachment portion (104) is secured and upon which the upper package or packages have been placed. The lower package cavities (302) may be on any surface of the lower package (300). For example, the lower package cavity (302) may be on the top surface of the lower package (300), and the corner boards may be attached to the lower package attachment portion (104) without wings.

Figure 4:
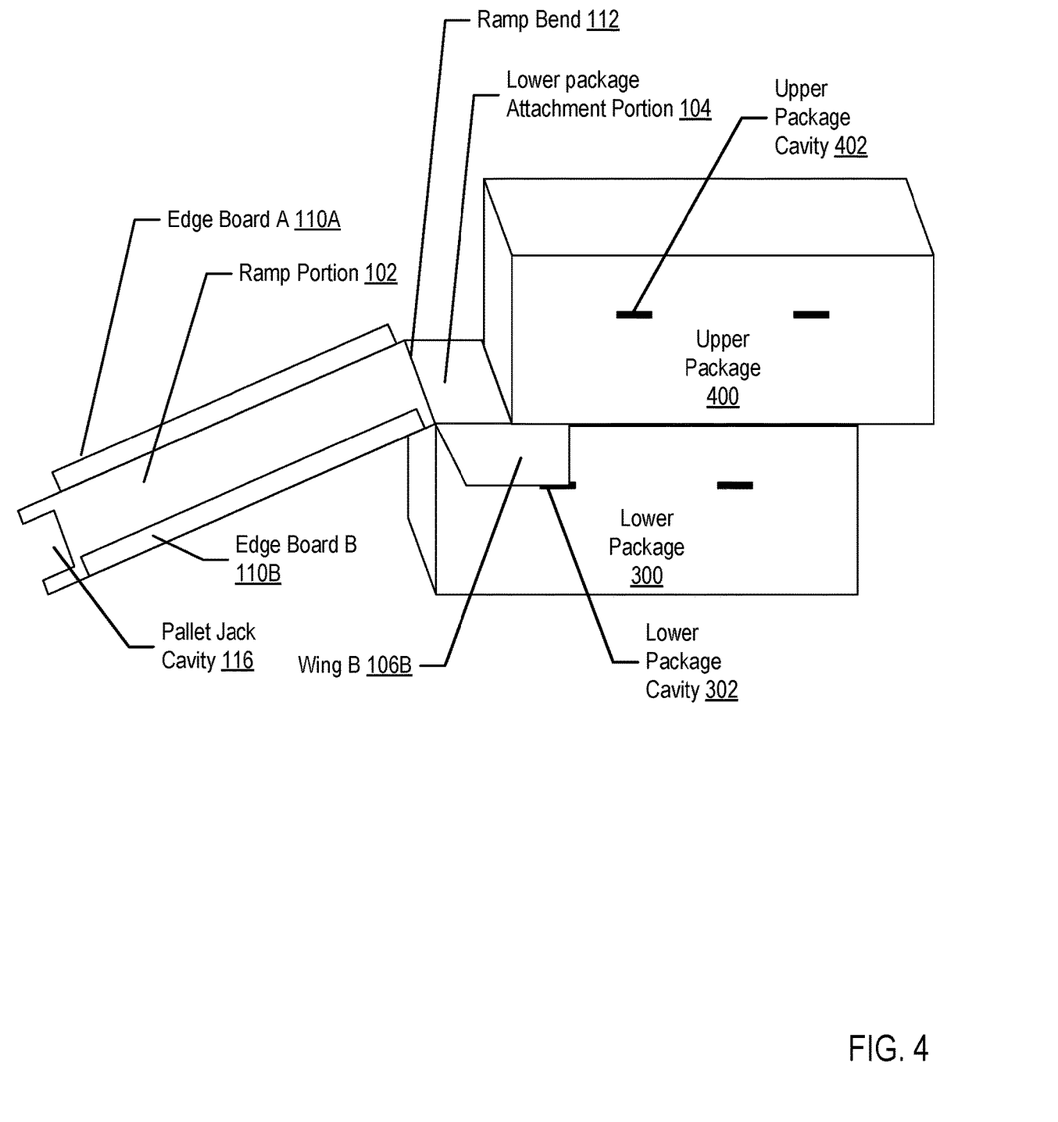
FIG. 4 sets forth an isometric diagram of an integrated shipping ramp for multi-package unit loads according to embodiments of the present invention.

FIG. 4 shows an exemplary integrated shipping ramp in the dismounting configuration in accordance with the present invention. As shown in FIG. 4, an upper package (400) is placed atop the lower package (300) and has been pushed back enough to allow the lower package attachment portion (104) of the integrated shipping ramp to be placed atop the lower package (300). From the configuration shown in FIG. 4, a worker need only push the upper package (400) toward the integrated shipping ramp until gravity drags the upper package (400) down the ramp portion (102) of the integrated shipping ramp, thereby placing the upper package (400) on a surface even with the lower package (300) (e.g., the floor) or on a pallet jack inserted into the pallet jack cavity (116). The worker need not lift the upper package (400) to remove the upper package from the lower package (300)

The upper package (400) is a package atop a lower package (300). Each package (upper package (400), lower package (300)) in a multi-package unit load may have similarly placed cavities (upper package cavity (402), lower package cavity (302)). Further, each package (upper package (400), lower package (300)) may be heavy relative to the strength of a single worker, and may contain high value and fragile equipment.

Material placed between the two packages may be overlapped with the lower package attachment portion (104) to aid in maneuvering the upper package toward the ramp portion (102) and over any lip created by the lower package attachment portion (104).

When a pallet jack is positioned in the pallet jack cavity (116) and an upper package (400) is pushed down the ramp portion (102) of the integrated shipping ramp, the momentum of the upper package (400) sliding down the ramp portion (102) onto the pallet jack may cause the pallet jack to automatically disengage from the pallet jack cavity and pull away from the integrated shipping ramp.

Figure 5:
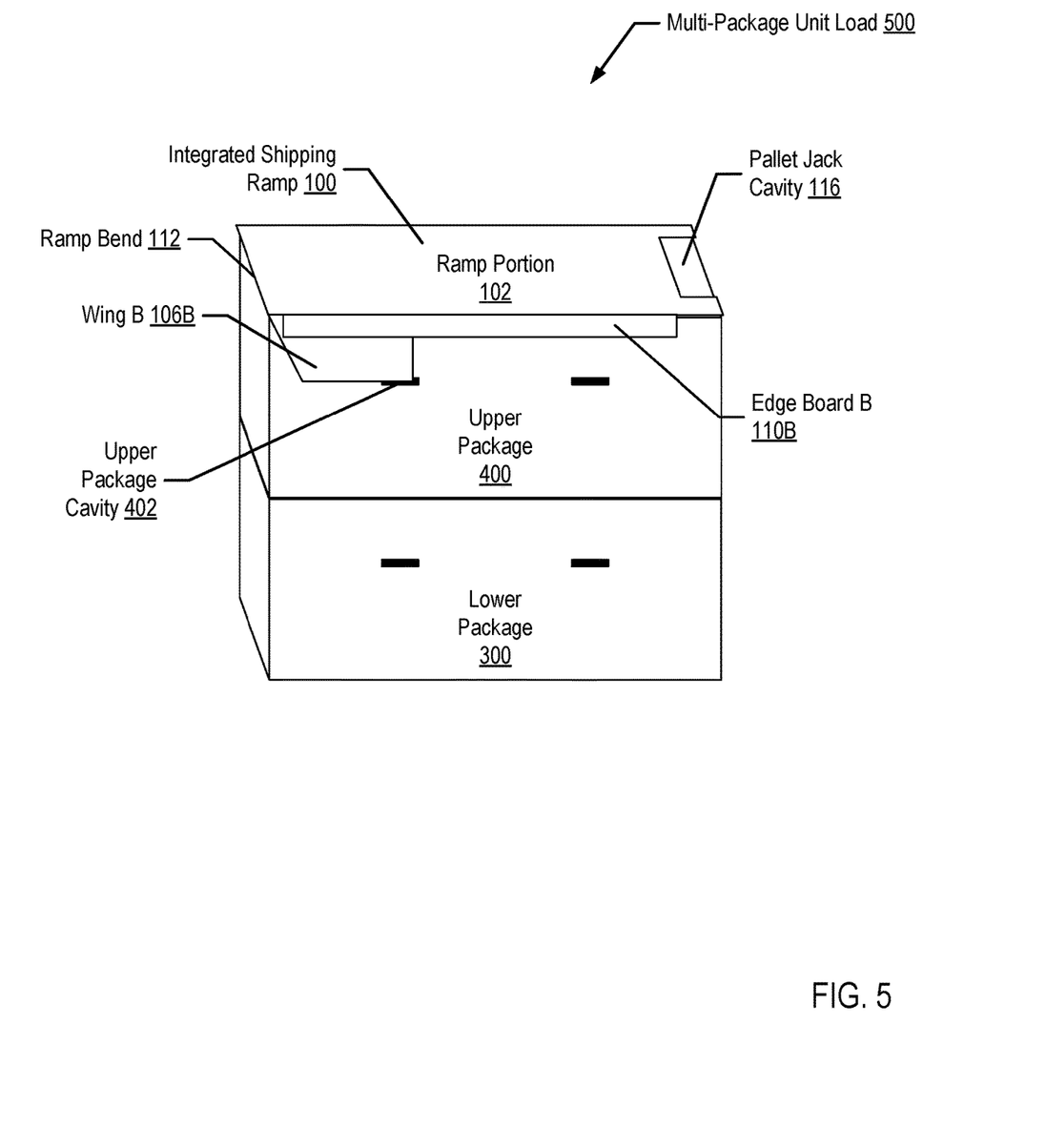
FIG. 5 sets forth an isometric diagram of a multi-package unit load according to embodiments of the present invention.

FIG. 5 shows an exemplary multi-package unit load (500) with an integrated shipping ramp (100) in a shipping configuration in accordance with the present invention. As shown in FIG. 5, the ramp portion (102) has been folded, at the ramp bend (112) and toward the top surface of the integrated shipping ramp (100), on top of the lower package attachment portion. The corner board on wing B (106B) has been inserted into an upper package cavity (402). The top surface of the upper package (400) is set against the bottom surface of the lower box attachment portion and the top surface of the ramp portion (102) of the integrated shipping ramp (100). The upper package (400) is also between edge board A (not shown) and edge board B (110B). In the shipping configuration, the integrated shipping ramp (100) may be placed alongside any surface of the multi-package unit load (500). Although shown with only a single upper package (400), the multi-package unit load (500) may include multiple upper packages.

In view of the explanations set forth above, readers will recognize that the benefits of an integrated shipping ramp for multi-package unit loads according to embodiments of the present invention include:

the integrated shipping ramp reduces time required to separate packages within a multi-package unit load,
the integrated shipping ramp reduces the number of workers required to remove packages from a multi-package unit load,
the integrated shipping ramp reduces or eliminates the need for lifting equipment to remove packages from a multi-package unit load,
the integrated shipping ramp reduces risk of damage to packages within a multi-package unit load,
the integrated shipping ramp reduces risk of injury from removing packages from a multi-package unit load,
the integrated shipping ramp does not require a large amount of additional space in the multi-package unit load,
the integrated shipping ramp safely guides upper packages to a pallet jack,
the integrated shipping ramp fits all packages in the multi-package unit load,
the integrated shipping ramp does not require a complicated installation, It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An integrated shipping ramp comprising:
 a ramp portion configured to guide an upper package down from atop a lower package;
 a lower package attachment portion comprising a corner board for insertion into a cavity of the lower package, wherein the corner board is separate from the ramp portion, and wherein inserting the corner board into the cavity of the lower package secures the lower package attachment portion to the lower package; and
 wherein in a shipping configuration the ramp portion is integrated with a multi-package unit load comprising the upper package and the lower package, with the lower package attachment portion secured to the upper package via the corner board inserted into a cavity of the upper package,
 wherein in a dismounting configuration the ramp portion provides an inclined platform from a top of the lower package to a height below the top of the lower package.

2. The integrated shipping ramp of claim 1, wherein the lower package attachment portion comprises a wing configured to bend toward a bottom surface of the integrated shipping ramp, and wherein the corner board is attached to the wing.

3. The integrated shipping ramp of claim 2, wherein the lower package attachment portion comprising the wing is wider than the ramp portion, and wherein the wing comprises a hinge configured to bend the wing toward the bottom surface of the integrated shipping ramp.

4. The integrated shipping ramp of claim 1, wherein the ramp portion comprises two edge boards along each side of the ramp portion configured to guide the upper package down from atop the lower package.

5. The integrated shipping ramp of claim 1, wherein in the shipping configuration the ramp portion is folded, at a ramp bend, on top of the lower package attachment portion.

6. The integrated shipping ramp of claim 5, wherein in the shipping configuration the ramp portion is folded, at the ramp bend, on top of the upper package.

7. The integrated shipping ramp of claim 1, wherein the ramp portion comprises a pallet jack cavity within the ramp portion configured to receive a pallet jack.

8. A multi-package unit load comprising:
 an upper package;
 a lower package comprising a cavity configured to receive a corner board; and
 an integrated shipping ramp comprising:
 a ramp portion configured to guide the upper package down from atop the lower package; and
 a lower package attachment portion comprising the corner board for insertion into the cavity of the lower package, wherein the corner board is separate from the ramp portion, and wherein inserting the corner board into the cavity of the lower package secures the lower package attachment portion to the lower package,
 wherein in a shipping configuration the ramp portion is integrated with the multi-package unit load, with the lower package attachment portion secured to the upper package via the corner board inserted into a cavity of the upper package, and
 wherein in a dismounting configuration the ramp portion provides an inclined platform from a top of the lower package to a height below the top of the lower package.

9. The multi-package unit load of claim 8, wherein the lower package attachment portion comprises a wing configured to bend toward a bottom surface of the integrated shipping ramp, and wherein the corner board is attached to the wing.

10. The multi-package unit load of claim 9, wherein the lower package attachment portion comprising the wing is wider than the ramp portion.

11. The multi-package unit load of claim 8, wherein the ramp portion comprises two edge boards along each side of the ramp portion configured to guide the upper package down from atop the lower package.

12. The multi-package unit load of claim 8, wherein in the shipping configuration the ramp portion is folded, at a ramp bend, on top of the lower package attachment portion.

13. The multi-package unit load of claim 12, wherein in the shipping configuration the ramp portion is folded, at the ramp bend, on top of the upper package.

14. The multi-package unit load of claim 8, wherein the ramp portion comprises a pallet jack cavity within the ramp portion configured to receive a pallet jack.

* * * * *